Andrew J. Burke.
Soldering-Furnace.

116,410.  PATENTED JUN 27 1871

Witnesses:

Inventor:
Andrew J. Burke.
Per
Attorneys.

UNITED STATES PATENT OFFICE.

ANDREW J. BURKE, OF BALTIMORE, MARYLAND.

IMPROVEMENT IN SOLDERING APPARATUS.

Specification forming part of Letters Patent No. 116,410, dated June 27, 1871.

*To all whom it may concern:*

Be it known that I, ANDREW J. BURKE, of Baltimore, in the county of Baltimore and State of Maryland, have invented a new and Improved Soldering-Furnace; and I do hereby declare the following to be a full, clear, and exact description of the same, reference being had to the accompanying drawing making a part of this specification, in which—

Figure 1:
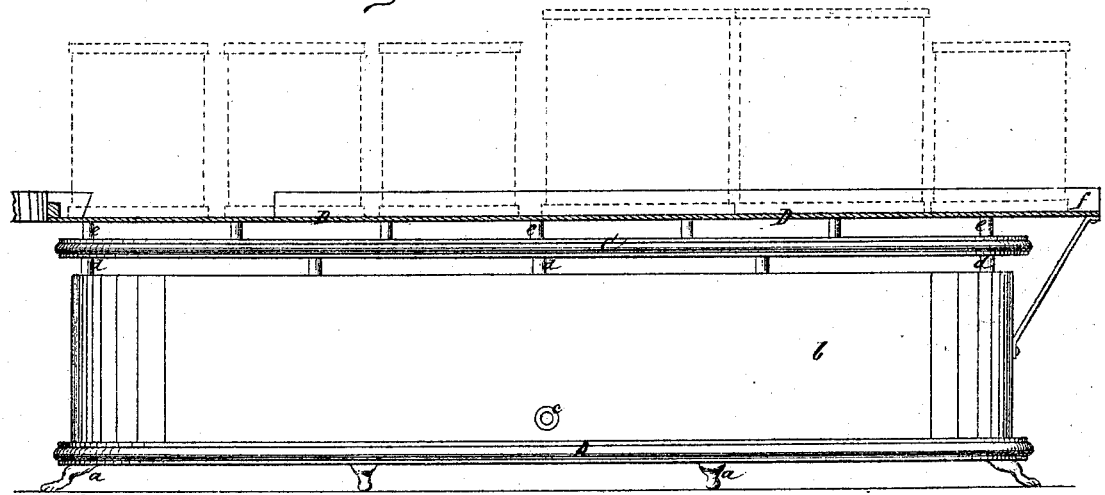
Figure 2:
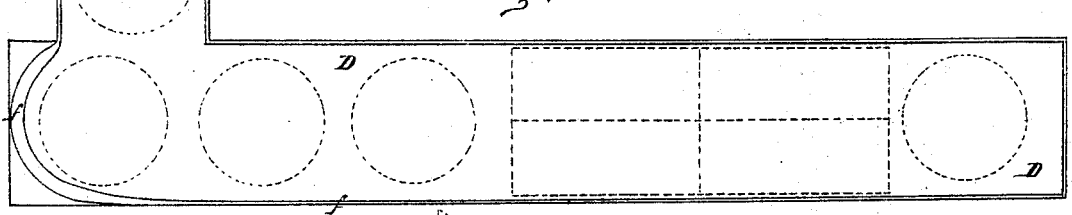
Figure 3:
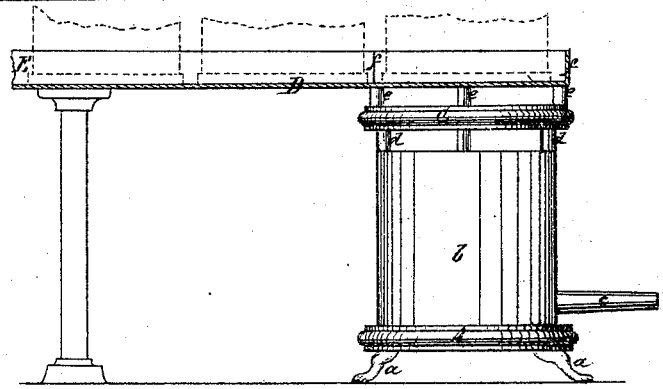

Figure 1 is a side elevation; Fig. 2, a plan view; and Fig. 3, an end elevation.

This invention relates to an improved apparatus, whereby the soldering of the parts of tin cans is rapidly effected without the use of a soldering-iron, and without lifting the can when once set on a heated plate, the cans being caused to gradually advance along said plate till the solder is melted, when they are successively shoved aside onto a cooler plate, where they remain till the solder cools and the parts are thereby joined together.

Referring to the drawing, A is an oblong platform resting on legs $a$ and supporting a sheet-metal case, $b$, that sits near the sides and ends of the platform. Upon the platform and within the case is placed any desired number of ordinary gas-stoves, Fig. 3, which are supplied with gas by means of pipes $c$, leading outside the case $b$. On the top of the latter a rail, C, is supported by means of legs $d$. On the rail C an oblong copper plate, D, is supported by means of legs $e$. The copper plate has vertical flange $f$ running around its edge, except at one end, and a sheet-iron platform, E, secured to one side near the other end, there being a gap in the flange $f$ opposite the platform E sufficiently wide to allow a can to be shoved off from one upon the other. The copper plate, being exposed to the flame of the gas-stoves, becomes highly heated. The cans, with the top piece applied, are dipped in pulverized resin, supplied with solder inside, and placed, one after another, on the copper plate at the open end thereof. Every time a fresh can is placed on the plate those already there are moved along a certain distance. Each can, therefore, gradually travels from one end of the copper plate to the other, absorbing heat all the time, so that when it arrives opposite the platform E the solder and resin are in a fluid state. The cans are shoved off sidewise upon the platform E as fast as they reach the latter, and there they remain until the solder is cooled and the top pieces made fast to the shells. The cans are then removed to have the bottom pieces fastened on in the same way on a similar-heated plate. Cans can be made in this way much more quickly than by the old method.

Having thus described my invention, what I claim as new, and desire to secure by Letters Patent, is—

The combination of the platform A, case $b$, rail C, plate D, and platform E, as specified.

ANDREW J. BURKE.

Witnesses:
  THOS. D. D. OURAND,
  SOLON C. KEMON.